Jan. 1, 1946.   W. B. GRIFFITH   2,392,087
VENT VALVE FOR THERMOSTATIC DEVICES
Filed Nov. 2, 1943

Inventor:
William B. Griffith
By F. DeWitt Goodwin
Attorney

Patented Jan. 1, 1946

2,392,087

UNITED STATES PATENT OFFICE 2,392,087

VENT VALVE FOR THERMOSTATIC DEVICES

William B. Griffith, Stone Harbor, N. J.

Application November 2, 1943, Serial No. 508,723

3 Claims. (Cl. 297—3)

My invention relates to improvements in thermostatic devices adapted for use in connection with fire protection systems, including apparatus adapted for closing an electrical circuit, and for operating mechanical releasing devices.

My invention particularly relates to devices having an air chamber associated with a distendable wall or diaphragm, movable by the pressure of expanded air in said chamber upon a sudden increase in the temperature of the air in the event of a fire in the zone where the device is located. The air chambers are now provided with slow leak vents through which variations in the pressure of the air within the chambers may equalize with the atmosphere without distending the diaphragms.

The object of my invention is to provide a thermostatic device with means for automatically closing the air chamber vent and sealing said chamber upon the occurrence of a fire.

A further object is to provide a novel vent valve for automatically closing the vent of an air chamber at a predetermined temperature.

A further object is to construct a valve which is normally movable to vent closing position and having fusible means adapted for holding the valve in vent opening position, during normal changes in temperature, and for releasing the valve at a predetermined temperature caused by a fire within the zone where the air chamber is located, whereby the expanded air will be confined within said chamber for quickly distending the diaphragm.

A further object is to provide a novel valve casing adapted to be mounted upon an air chamber or connected with the latter, said valve casing having the air vent formed therein, and means for positively moving the valve to vent closing position when the valve is released by the melting of the fusible means.

A further object is to construct the valve casing with an adjustable slow leak vent, and a valve adapted for closing said vent at a predetermined temperature.

A further object is to provide a retaining member engaging the valve and fusible means securing said retaining member positioned for holding the valve in vent opening position.

These together with various other novel features of construction and arrangement of the parts, which will be hereinafter more fully described and claimed, constitute my invention.

Referring to the accompanying drawing.

Figure 1:
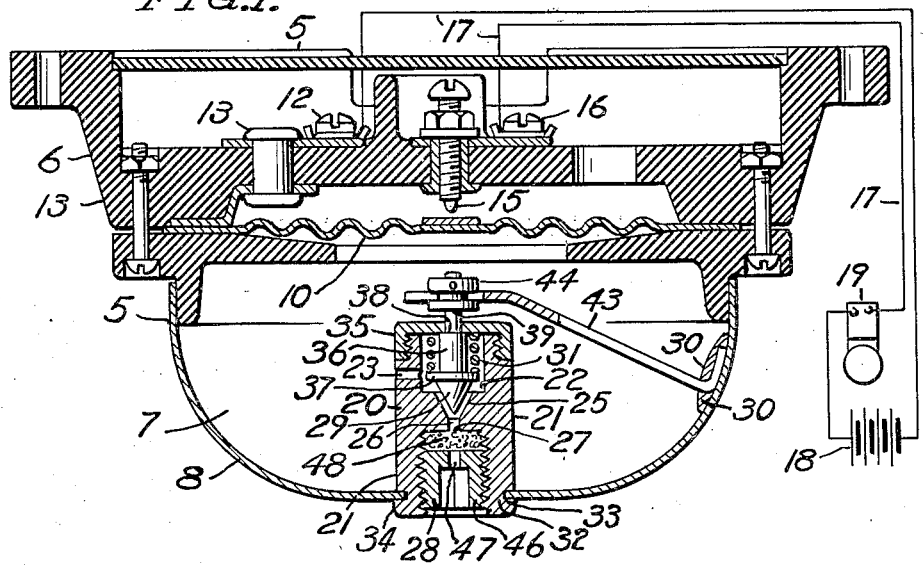
Fig. 1 is a central vertical sectional view of a thermostat, adapted for closing an electric circuit, and embodying my invention.

In the drawing, in which like reference characters refer to like parts, Fig. 1 illustrates my invention embodied in a thermostat 5, which may be of any well known construction, having a base 6, of insulating material, upon which is mounted an air chamber 7, comprising a thin heat conducting metal shell 8, and a distendable element, or diaphragm 10, the latter forming a wall of the air chamber 7. The diaphragm 10 is electrically connected with a binding screw 12 by a conductor 13 and forms a terminal of an electric circuit. A terminal screw 15 is mounted upon the base 6 in spaced relation with the diaphragm and is connected with a binding screw 16, and said screw 15 forms another terminal of the electric circuit.

Said binding screws 12 and 16 are adapted to be connected in a circuit 17, including a source of potential 18 and an energizable device 19. The diaphragm 10 is adapted to be distended into contact with the terminal 15, by air under pressure within the chamber 7, for completing the electric circuit, when the temperature of the air in said chamber is suddenly increased by the action of heat caused by a fire in the zone where the thermostat is located.

In the construction of heat actuated devices having an air chamber and a diaphragm adapted to be distended by air under pressure it has been the practice to provide the air chamber with an adjustable slow leak vent through which the air may equalize with the atmosphere during normal changes in temperature without distending the diaphragm. Devices having air chambers with slow leak vents are disclosed in the patents to Cuttriss No. 522,972, July 17, 1894, and Himmer No. 1,174,149, March 7, 1916.

My present invention consists of providing a device having an air chamber with a vent valve adapted for sealing the vent of the air chamber, in the event of a fire, so that the air will be positively retained in the air chamber and the increasing air pressure utilized to distend the diaphragm and operate the device.

The vent valve 20, as shown in Fig. 1, comprises a valve casing 21, having an axial bore 22 and an air inlet aperture 23 in communication with said bore and with the air chamber 7.

The casing 21 has a conical valve seat 25 surrounding a vent 26 which is in communication with the bore 22 and having an outlet aperture 27, communicating with the atmosphere without the air chamber 7, through a slow leak regulating device 28, hereinafter more fully described. A valve 29 is mounted for movement within the bore 22 and is normally movable toward the seat 25 for closing the vent 26.

Fusible means 30, in the form of soft solder, is provided for retaining the valve 29 in spaced relation with the valve seat 25. Said fusible means 30 is adapted for releasing the valve 29 at a predetermined temperature, whereby the valve will automatically close upon said seat, and form a closure for the vent 26 of the air chamber 7. A spring 31 is provided for positively urging the valve 29 to vent closing position upon the seat 25.

A preferred form of my invention is shown in Fig. 1, in which the valve casing 21 is mounted within the air chamber 7, with said inlet aperture 23 in communication with the chamber 7. The casing 21 has a reduced end portion 32 which extends through an aperture 33 formed through the shell 8, forming the air chamber 7. The casing 21 is tightly secured upon the shell 8 by a riveted flange 34.

The valve casing 21 is provided with a detachable cap 35 which is in threaded engagement with the body portion of the casing 21.

The valve 29 has a cylindrical axial stem portion 36 and an enlarged flange 37 located adjacent to the conical head forming the valve proper. Said stem portion 36 forms a shoulder 38, located adjacent to a reduced axial stem portion 39 and engages the cap 35. Said portion 39 extends through an aperture formed through the cap 35 and is freely movable relatively to the cap.

Said spring 31 is interposed between the flange 37 and the cap 35 and tends to urge the valve 29 to vent closing position upon the valve seat 25.

As shown in Fig. 1, the valve 29 is maintained in vent opening position by a supporting member 43, arranged for engaging a sleeve 44, secured upon the valve stem portion 39, for holding the valve 29 against the action of the spring 31. The opposite end of the member 43 is detachably secured, by said fusible means 30, to a part of the thermostat which is exposed to sudden changes in temperature, it is preferably secured to the inner surface of the shell 8, so that an increase in temperature, due to a fire, will melt the fusible means 30 and release the member 43, which in turn will release the valve 29 and allow the latter to move to vent closing position, or urged by the spring 31, should the valve be mounted for movement upon some axis out of a vertical position.

The valve supporting member 43 may be formed of spring metal having sufficient resiliency for holding the valve 29 in the open position against the action of the spring 31, thus eliminating the necessity of locating the member 43 in an exact position upon the shell 8.

The valve casing 21 is provided with said slow leak regulating device 28, which is mounted directly upon the valve casing 21. Said device 28 is of standard construction and comprises a sleeve 46, having an orifice 47, in communication with said outlet aperture 27. Said sleeve 46 is in threaded engagement with the casing 21 and is adapted for compressing filtering material 48 for regulating the rate of flow of air from the air chamber 7, thereby permitting slow changes in the pressure of air in the chamber 7 to equalize with the atmosphere without actuating the diaphragm 10.

In the event of a fire in the zone where the thermostat is located the fusible means 30 will melt and release the valve supporting member 43 and allow the valve 29 to move, or urged by the action of the spring 31, to vent closing position upon the seat 25, for retaining the air under pressure within the air chamber 7, thus distending the diaphragm 10 into contact with the terminal screw 15, for completing an electrical circuit, or operating other well known devices.

Figure 2:
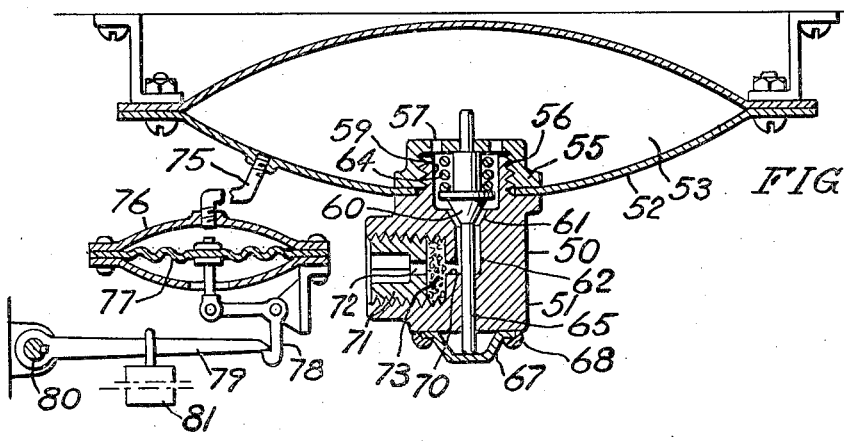
Fig. 2 is a view similar to Fig. 1, of a thermostat, adapted for operating a mechanical device, and embodying another form of my invention.

Another form of my invention is illustrated in Fig. 2, which comprises a valve casing 50 having a body portion 51 extending without the shell 52, of the air chamber 53. The casing 50 is secured to the shell 52 by means of a cap 55 which is in threaded engagement with a reduced portion 56 of the body portion 51. Said cap is adapted for tightly clamping the shell 52 between the cap and the body portion 51. The cap 55 is provided with an air inlet aperture 57 which is in communication with the air chamber 53.

The body portion 51 has an axial bore 59 in which a conical valve 60 is mounted for movement to and from a conical valve seat 61, formed upon the body 51 and surrounding a portion of the bore forming a vent 62. A spring 64 tends to move the valve 60 to vent closing position upon the seat 61.

The valve 60 is provided with a stem 65 which is slidably mounted in the body 51. Said stem 65 terminates adjacent to the outer end of the body 51 and is held in vent opening position of the valve 60 against the action of the spring 64, by a supporting member 67, which latter is secured directly to the body 51 by fusible means 68, fusible at a predetermined temperature.

The body 51, of the valve casing, is provided with a lateral passage forming an air outlet aperture 70 which is in communication with the vent 62. A sleeve 71, having an aperture 72, is adjustably mounted upon the body 51 and located upon an axis extending at right angles to the stem 65, to allow the latter to extend through the body 51. Said sleeve 71 is adapted for compressing filtering material 73, for regulating the rate of flow of air through the outlet aperture 70, between the air chamber 53 and the atmosphere, when the valve 60 is in vent opening position.

The thermostatic device shown in Fig. 2, with which my invention is embodied, consists of said air chamber 53, formed by the rigid shell 52. The chamber 53 is connected by a pipe 75 with an expansion chamber 76, having a distendable wall, or diaphragm 77, which latter is adapted for releasing levers 78 and 79. The lever 79 is adapted for rotating a shaft 80, by the action of a weight 81, when released by the movement of the diaphragm 77 by pressure of expanded air in the chamber 53, responsive to the action of heat applied to the shell 52. Devices of this character are well known in the art.

Figure 3:
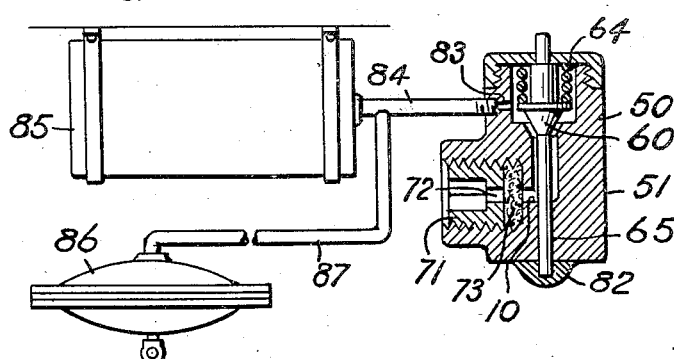
Fig. 3 is a central vertical sectional view of still another form of my novel vent valve, shown connected with a thermostatic device.

Fig. 3 illustrates a form of my invention similar to that shown in Fig. 2, with the exception that the valve 60 is held in vent opening position by fusible means 82, which is secured directly to the valve stem 65 and to the outer end of the body 51 of the valve casing 50, thus eliminating the use of the supporting members 43 and 67, shown in Figs. 1 and 2.

In Fig. 3 the valve casing 50 is shown provided with a threaded air inlet aperture 83, for the connection of a pipe 84, which is in communication with an air chamber 85. An expansion chamber 86, similar to the expansion chamber 76, shown in Fig. 2, is shown connected with the air chamber 85 by a pipe 87 and said pipe 84.

When the fusible means 82 fuses, the valve stem 65 will be released from the valve casing 50, and the valve 60 will be moved to vent closing position by the action of the spring 64, thus retaining the air in the chamber 85 and in the expansion chamber 86 for operating a releasing device, as above described.

The operation of my invention is as follows: The valve casing is provided with an air passage forming a vent through which normal changes in the air pressure within the air chamber may equalize with the atmosphere, during slow changes in the temperature of the air surrounding the air chamber, without distending the diaphragm. The valve casing is provided with adjustable means for varying the rate of flow of the air through the vent so that a sudden increase in the temperature, due to a fire, will cause the diaphragm to be distended and operate the device. Should the increase in temperature be slow, due to a smouldering fire, the pressure within the air chamber may equalize with the atmosphere without distending the diaphragm. My novel vent valve provides means for positively sealing the air chamber when the fire increases sufficiently to melt the fusible means. The fusing of the fusible means releases the valve proper for movement to vent closing position, thus retaining the air within the air chamber. A further increase in temperature causes a further increase in the pressure of the air in the air chamber, which pressure distends the diaphragm for operating a device adapted for fire protection purposes.

Various changes in the construction and arrangement of the parts may be made without departing from my invention.

I claim:

1. In a thermostatic device having a metal shall forming an air chamber, a distendable element adapted to be distended by expanded air in said chamber responsive to heat, a valve casing mounted upon said shell, said casing having a longitudinal bore in communication with said chamber, a valve seat upon said casing surrounding said bore, said casing having a vent forming a communication between said seat and the atmosphere without said chamber, a valve stem mounted for axial movement within said bore, a valve mounted upon said stem, a spring tending to slide said stem axially for closing the valve upon said seat, a valve supporting plate extending radially at right angles to the axis of said stem, fusible means securing said plate positioned upon the axis of the stem for opposing the movement of the stem by the action of the spring, and said fusible means adapted to fuse at a predetermined temperature to release said plate and permit the valve to close upon said seat.

2. In a thermostatic device having a metal shall forming an air chamber, a distendable element adapted to be distended by expanded air in said chamber responsive to heat, a valve casing mounted upon said shell, said casing having a longitudinal bore in communication with said chamber, a valve seat upon said casing surrounding said bore, said casing having a vent forming a communication between said bore at the axis of said seat and the atmosphere without said chamber, a valve stem mounted for axial movement within said bore, a valve mounted upon said stem, a spring tending to slide said stem axially for closing the valve upon said seat, said stem having an end portion extending from said casing into said chamber, a valve supporting plate having one end portion extending radially at right angles to the axis of the stem, means upon said end portion of the stem adapted to be engaged by said plate, fusible means securing the opposite end of said plate upon the inner surface of said shell, said plate having sufficient rigidity for holding the stem against the action of said spring for normally maintaining the valve in spaced relation to said seat, and said fusible means responsive to heat at a predetermined temperature for releasing said plate for movement of the valve to vent closing position upon said seat.

3. In a thermostatic device having an air chamber, a distendable element adapted to be distended by the expansion of air in said chamber responsive to heat, a valve casing having a bore in communication with said chamber, a valve seat upon said casing surrounding said bore, said casing having a vent in communication with said bore at the axis of said seat and in communication wtih the atmosphere without said chamber, a valve stem mounted for movement upon the axis of said bore, a valve mounted upon said stem, a spring tending to close the valve upon said seat, fusible means supporting said stem with the valve in spaced relation to said seat and adapted to release the stem at a predetermined temperature for movement of the valve to vent closing position upon said seat, a sleeve upon the casing located in said vent between said seat and the end of the vent which is open to the atmosphere, said sleeve having an orifice in communication with said vent, and means for adjusting said sleeve upon the casing for varying the size of said vent independently of the position of said valve relatively to said seat.

WILLIAM B. GRIFFITH.